United States Patent [19]

Guarracini

[11] 4,040,089
[45] Aug. 2, 1977

[54] DISC MASTER POSITIONING APPARATUS FOR A RECORDING SYSTEM

[75] Inventor: Joseph Guarracini, Lawrenceville, N.J.

[73] Assignee: RCA Corporation, New York, N.Y.

[21] Appl. No.: 701,417

[22] Filed: June 30, 1976

[30] Foreign Application Priority Data

June 14, 1976 United Kingdom ............... 24562/76
June 17, 1976 United Kingdom ............... 24562/76

[51] Int. Cl.² .......................... G11B 3/62; H04N 5/76
[52] U.S. Cl. .................. 358/128; 274/39 R; 179/100.1 B; 360/97; 360/86; 179/100.4 C; 179/100.3 V
[58] Field of Search ............... 358/128, 129, 130, 132, 358/127; 179/100.3 V, 100.4 C, 100.4 R, 100.3 A, 100.1 B; 360/97, 99, 86; 340/173 TP, 173 CR; 346/158, 159, 151, 161; 274/39 R, 39 A

[56] References Cited

U.S. PATENT DOCUMENTS

| 2,937,916 | 5/1960 | Hohnecker | 360/86 |
| 3,120,991 | 2/1964 | Newberry | 346/151 |
| 3,815,146 | 6/1974 | Nash | 358/128 |
| 3,842,217 | 10/1974 | Clemens | 358/128 |
| 3,980,308 | 9/1976 | Camerik | 360/86 |
| 4,010,318 | 3/1977 | Riddle | 358/128 |

Primary Examiner—Bernard Konick
Assistant Examiner—Alan Faber
Attorney, Agent, or Firm—Eugene M. Whitacre; William H. Meagher; Dilip A. Kulkarni

[57] ABSTRACT

A turntable has a central opening in which a centering spindle is snugly received for a reciprocal motion along the axis of rotation of the turntable. The centering spindle has a tapering end for engagement with walls defining a central aperture of a disc master in order to center the disc master relative to the turntable. A spring, located in the turntable central opening, biases the centering spindle in a direction such that the tapering end of the centering spindle, in engagement with the walls defining the central aperture of the disc master, urges the disc master against engaging ends of locating members, secured to the peripheral portion of the turntable, to locate a surface of the disc master in a recording plane defined by the engaging ends of the locating members. The locating members selectively occupy positions permitting installation and removal of the disc master.

4 Claims, 8 Drawing Figures

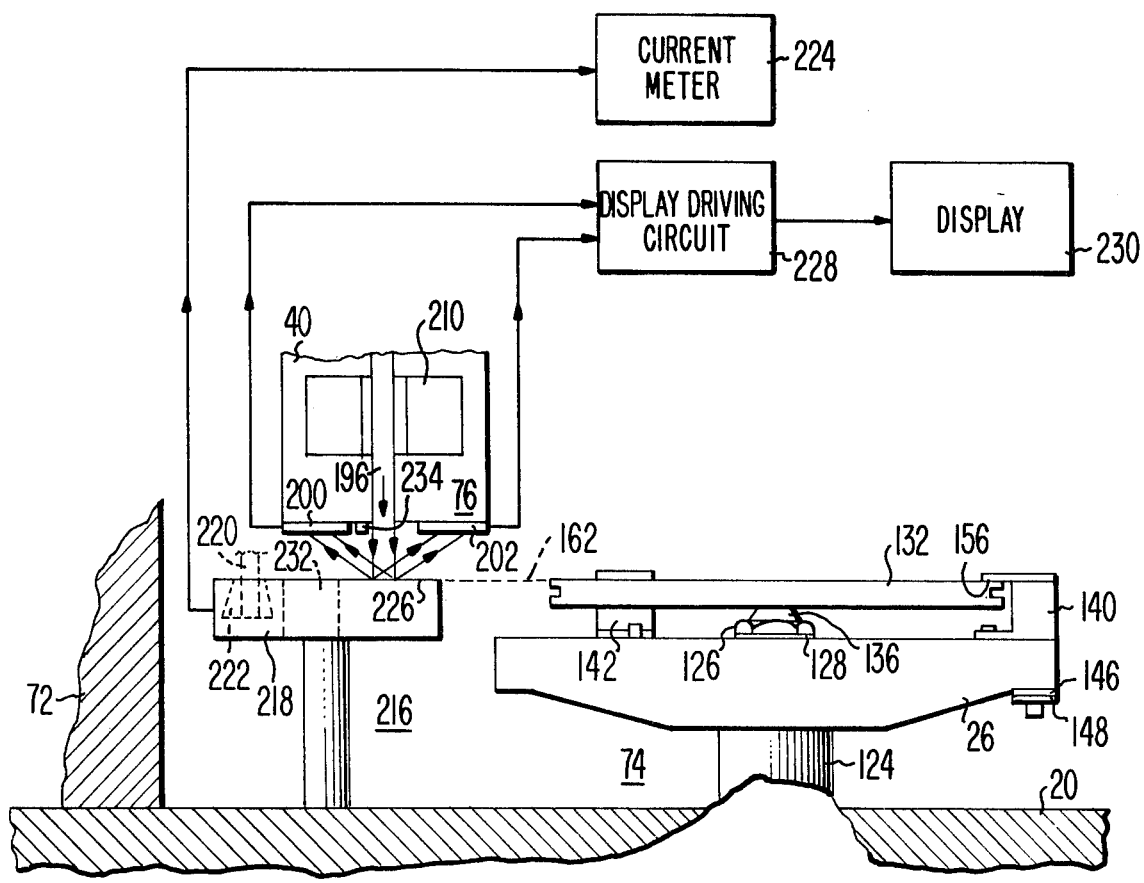
Fig.8
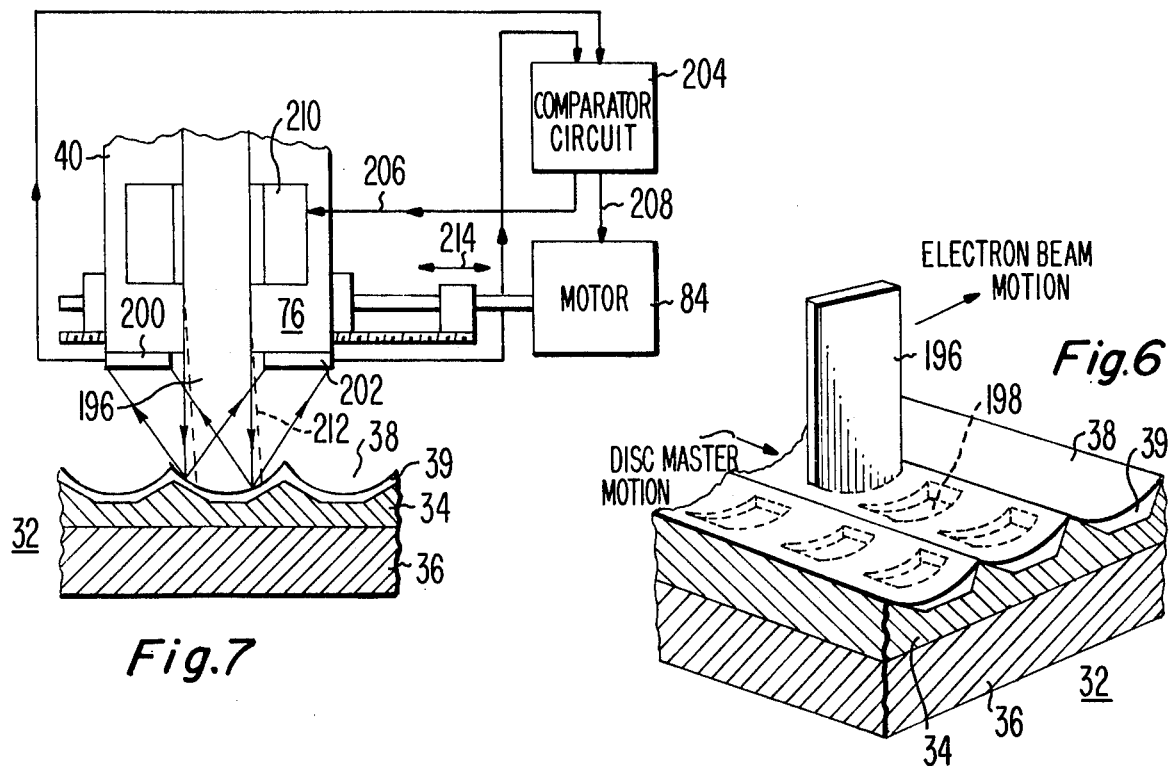
Fig.7
Fig.6

DISC MASTER POSITIONING APPARATUS FOR A RECORDING SYSTEM

This invention relates to an apparatus for recording signals on a disc master. More particularly, an apparatus is herein disclosed for positioning a disc master on a turntable of a recording system.

In certain recording systems, a signal representative beam of energy, provided by a recorder column, is applied to an energy-responsive surface of a disc master rotatably supported by a turntable during recording. A translational motion is established between the recorder column and the disc master along a path radially disposed relative to the axis of rotation of the turntable in order to record signals along a spiral track on the energy-responsive surface of the disc master. The beam of energy may be in the form of electron beam, laser beam, etc. Reference may be made to a U.S. patent application Ser. No. 701,416, filed concurrently herewith on Junw 30, 1976, by Reisner, Morewood and Riddle and entitled ELECTRON BEAM DISC RECORDER, for an illustration of an electron beam recording system, in which the present invention may be advantageously employed.

In the systems of the aforementioned type, it is desirable to center the disc master relative to the rotational axis of the turntable. Where the number of groove convolutions per inch are very high (e.g., 5,555 gcpi), and where the recorded signal elements are very small (e.g., smaller than wavelength of visible light), the centering of the disc master on the turntable must be very precise (e.g., ± 2.5 micrometers).

Additionally, in the systems of the abovesaid type, the beam of energy is focussed on the energy-responsive surface of the disc master. It is desirable that the energy beam remains focussed on the electron-responsive surface of the disc master as the recorder column is translated and the disc master is rotated by the turntable during recording. To this end, it is desirable that the energy-responsive surface of the disc master remains at a fixed distance from the recorder column throughout recording. Where the groove on the disc master is extremely shallow (e.g., 0.6 micrometers), and where the peak-to-peak groove modulation due to recorded signals is very small (e.g., 0.10 micrometers), the spacing between the energy-responsive surface of the disc master and the recorder column must be extremely exact.

The above-mentioned Reisner, et al., application discloses a column set-up stage mounted in the recording chamber adjacent to the outside perimeter of the turntable-mounted disc master. The recorder column is aligned with the column set-up stage in order to focus the electron beam on a focussing surface of the column set-up stage. The recorder column is then translated over an electron-responsive surface of the disc master for recording. In such systems, it is desirable to provide a simple arrangement which would permit ready location of the electron-responsive surface of the disc master in lateral registration with the focussing surface of the column set-up stage without complicated manual adjustments.

In accordance with the present invention, a centering spindle is mounted for a reciprocal motion along the axis of rotation of the turntable. The centering spindle has a tapering portion at one end for engagement with walls defining a central aperture of the disc master in order to center the disc master relative to the turntable. Means are provided for biasing the centering spindle in a direction such that the tapering end portion of the centering spindle, in engagement with the walls defining the central aperture of the disc master, urges the disc master against axial locating members, which are secured to the peripheral portion of the turntable, in order to locate a responsive surface of the disc master in registration with a recording plane defined by the axial locating members. The axial locating members selectively occupy certain positions which permit ready installation and removal of the disc master.

In the accompanying drawings:

FIG. 6 shows a portion of the disc master which is partly exposed by an electron beam by the recorder column of FIGS. 1 and 2;

Figure 1:
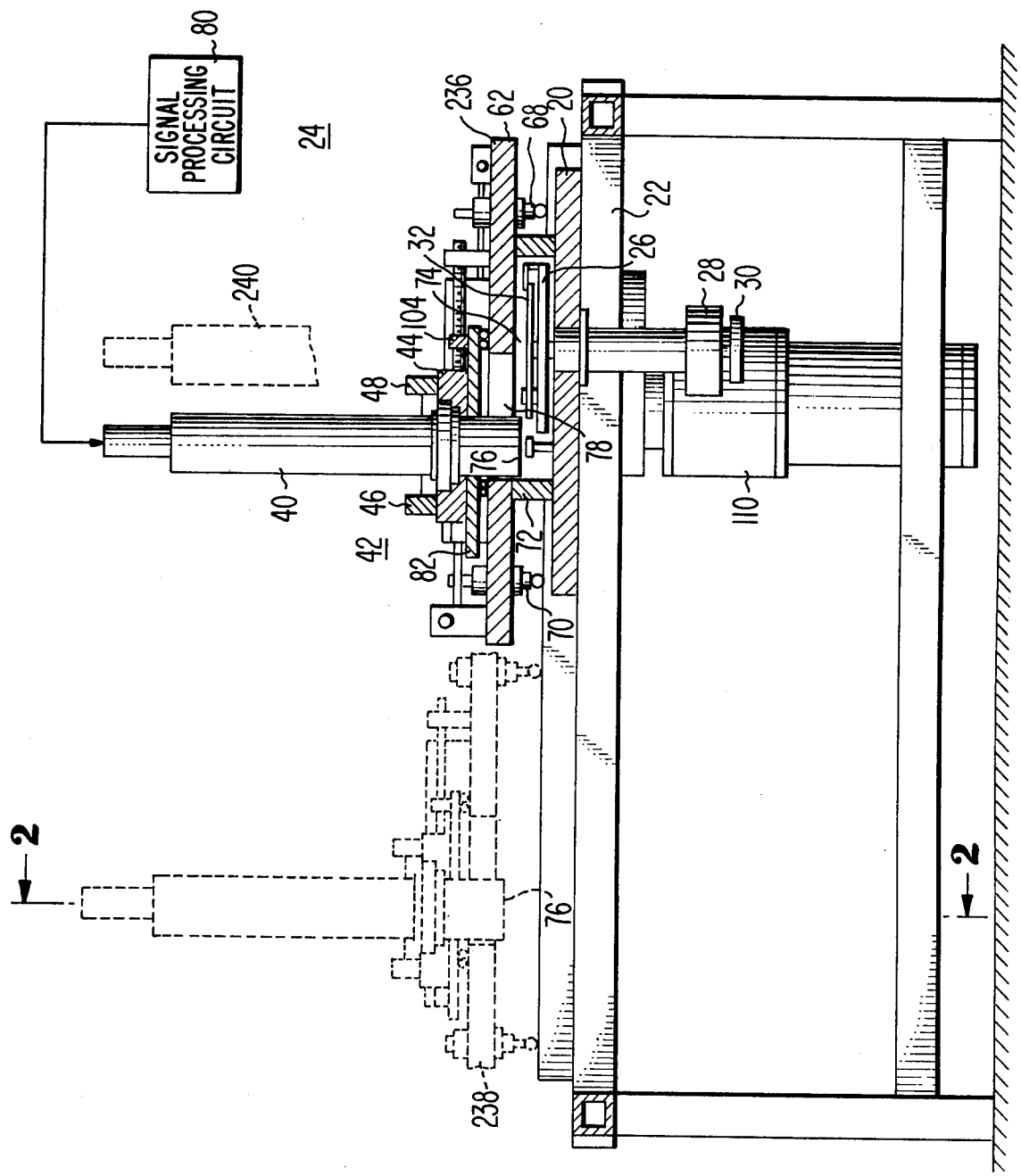
FIG. 1 is a diagrammatic representation of a side view, partly in section, of an electron beam disc recorder incorporating a disc master positioning apparatus in accordance with the present invention.
Figure 2:
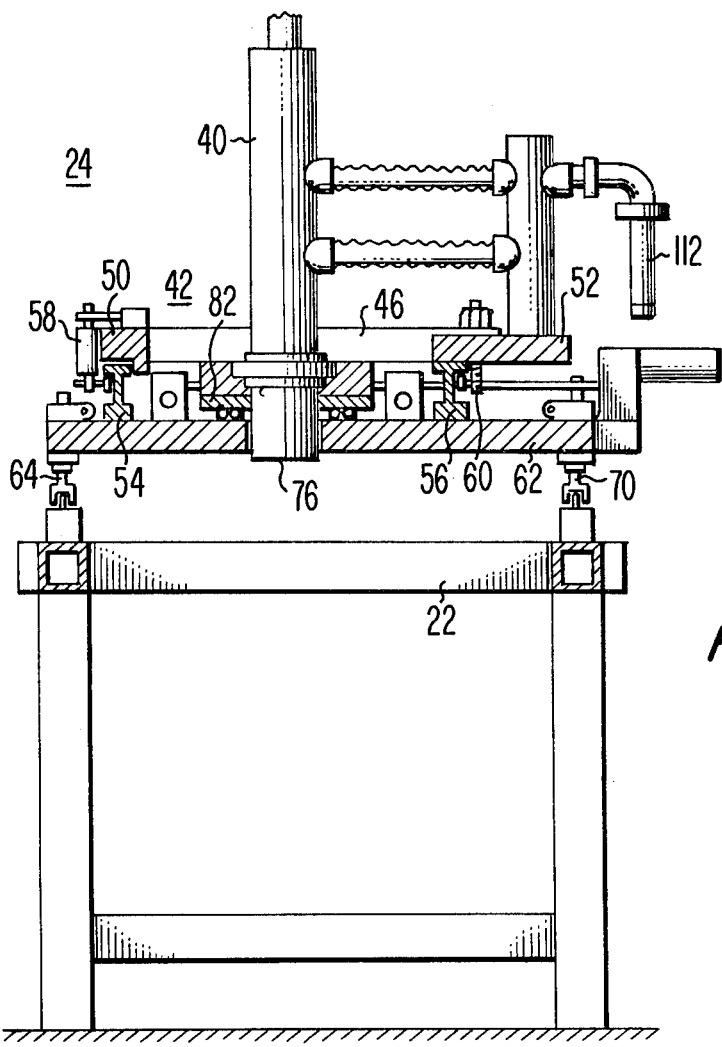
FIG. 2 is also a diagrammatic representation of a front view, partly in section along line 2—2 in FIG. 1, of the electron beam disc recorder.

FIG. 7 is a schematic representation of a system for centering the electron beam in a spiral groove disposed on the surface of the disc master, for use in a recording system employing the electron beam disc recorder of FIGS. 1 and 2; and FIG. 8 is a block diagram of a system for verifying the source of the electron beam, for use in a recording system employing the electron beam disc recorder of FIGS. 1 and 2.

In FIG. 1 an electron beam disc recorder 24, of the type disclosed in the afore-mentioned Reisner, et al., patent application, is illustrated. In the FIG. 1 apparatus 24, a base plate 20 is secured to a frame 22 of the electron beam disc recorder 24. A turntable 26 is rotatably mounted to the base plate 20. A motor 28 is provided for causing rotational motion of the turntable 26. A speed control system 30 maintains the rotational speed of the turntable at a predetermined level during recording operation. A pregrooved disc master 32 is supported on the turntable 26.

FIG. 6 shows a cross-sectional view of a portion of the disc master 32. A thin layer of copper 34 is deposited on an aluminum substrate 36. In an illustrative mode of disc master preparation, as described in the U.S. Pat. No. 3,882,214 (Nosker), a generally spiral groove 38 is machined on the surface of the copper layer 34, and the grooved surface of the copper layer 34 is coated with a thin deposit 39 of an electron sensitive material.

As shown in FIGS. 1 and 2, a recorder column 40 is mounted on a carriage 42. The carriage 42 comprises a platform 44 secured to connecting members 46 and 48. Cross members 50 and 52 are secured to the end portions of the connecting members 46 and 48. The cross members 50 and 52 ride on a pair of I-shaped rails 54 and 56 for supporting translational motion of the carriage 42. Assemblies 58 and 60 are provided for securing the carriage 42 to the rails 54 and 56. The assembly 58 additionally serves to properly locate the carriage 42 relative to the rails 54 and 56.

Figure 3:
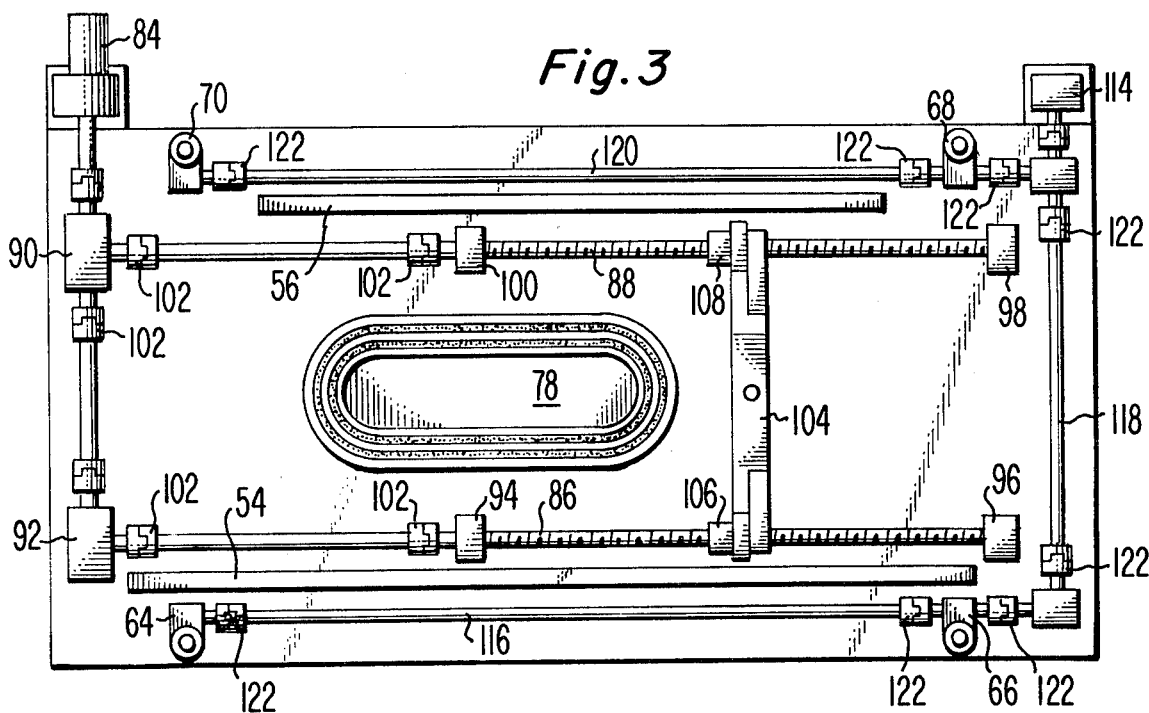
FIG. 3 is a top view of a cover plate on which the recorder column of the electron beam disc recorder of FIGS. 1 and 2 is mounted for translational motion.

Referring again to FIG. 2, the I-shaped rails 54 and 56 are mounted on a cover plate 62. The cover plate 62 is mounted on the frame 22 for a reciprocal motion relative to the basic plate 20 by a set of lifter assemblies 64, 66, 68, and 70. FIG. 3 shows a plan view of the cover plate 62.

The cover plate 62 is movable between a position 236 overlying a collar 72 secured to the base plate 20 (shown by solid lines in FIG. 1) to form a recording chamber 74, and a position 238 out of registry with the collar 72 (shown in phantom in FIG. 1) to permit loading/removal of the disc master 32 on the turntable 26. The cover plate 62 in the out-of-registry position 238 additionally permits access to a lower portion 76 of the recorder column 40 for cleaning, servicing, etc.

The lifter assemblies 64, 66, 68, 70 basically serve several purposes. They lift the cover plate 62 off the collar 72 so that the lower protruding portion 76 of the recorder column 40 may clear the top serface of the collar to permit movement of the cover plate from the overlying position 236 (shown by solid lines in FIG. 1) to the out-of-registry position 238 (shown in phantom in FIG. 1). Secondly, the lifter assemblies 64, 66, 68, 70 are provided with ball bearing rollers so that the cover plate 62 can be rolled to the out-of-registry position to permit, inter alia, access to a turntable supported disc master. As previously indicated, the cover plate 62 in the not-overlying position permits access to the lower protruding portion 76 of the recorder column 40 for cleaning, servicing, etc.

The recorder column 40 is seated precisely in an opening provided in the platform 44. The cover plate 62 has an oblong opening 78, as shown in FIG. 3, through which the lower portion 76 of the recorder column 40 projects into the recording chamber 74 for directing a signal representative beam of electrons toward the electron-responsive surface of the disc master 32. The position of the recorder column 40 over the disc master 32 is shown by the numeral 240 in FIG. 1. The dimensions of the oblong opening 78 are sufficient to accommodate the translational motion of the recorder column 40.

The recorder column 40 basically includes a source for providing a beam of electrons and a set of lenses for demagnifying the electron source on the electron-responsive surface of the disc master 32. Illustratively, the electron source may be of the type disclosed in a copending U.S. patent application Ser. No. 613,534 (Riddle and Demers), now Pat. No. 3,997,807, and the demagnifying lenses may be of the type shown in a copending U.S. patent application Ser. No. 613,535 (Riddle), now Pat. No. 4,010,318, both filed on Sept. 15, 1976. A signal processing circuit 80 is coupled to the recorder column 40 for modulating the electron beam in accordance with the signal to be recorded on the electron-responsive surface of the disc master 32.

A sealing plate 82 is secured to the platform 44 in order to cover the oblong opening 78 in the cover plate 62 as shown in FIG. 1. A set of O-rings are mounted in a corresponding set of channels formed in the cover plate 62 as depicted in FIG. 3. The channels are formed by a set of elliptical elements. The seal compression is obtained by supporting the weight of the recorder column 40 and vacuum load of the carriage 42 on the I-shaped rails 54 and 56. When, as in this particular embodiment, two O-rings are used, the space between them may be evacuated to improve the vacuum integrity of the recording chamber 74. Alternatively, the space between the O-rings may be filled with vacuum grease.

The compression of O-rings is adjusted to a predetermined value by varying the height of locating surfaces of the I-shaped rails 54 and 56. On the one hand, too much compression of the O-rings may result in a disturbing jitter of the record column 40 due to the breakaway friction between the sealing plate 82 and O-rings during translation of the recorder column. On the other hand, too little compression of the O-rings may jeopardize the vacuum integrity of the recording chamber 74. The correct compression of the O-rings permits a smooth translational motion of the recorder column 40, and, at the same time, facilitates maintenance of proper vacuum in the recording chamber 74.

As shown in FIG. 3, a motor 84 drives a set of lead screws 86 and 88 via a set of connecting shafts. Gear boxes 90 and 92 are interposed between the motor 84 and the lead screws 86 and 88 to, inter alia, reduce the speed of rotation of the lead screws. The lead screws 86 and 88 are supported by bearing blocks 94, 96, 98, and 100. Universal couplings 102 are used to eliminate problems, such as vibration, due to non-alignment of interconnecting shafts.

An equalizing bar 104 is fastened to a pair of nuts 106 and 108. The equalizing bar 104 is secured to the sealing plate 82 (FIG. 1). The nuts 106 and 108, respectively, engage the lead screws 86 and 88 for causing translational motion of the carriage 42 which carries the recorder column 40. The afore-described recorder column traversing arrangement advantageously permits the translational motion causing force to be in alignment with the centerline of the recorder column/carriage assembly.

The orientation of the rails 54, 56, supporting the translational motion of the carriage 42, is such that the translational motion of the carriage results in motion of the electron beam, provided by the recorder column 40, along a path radially disposed with respect to the center of rotation of the turntable-supported disc master 32.

A diffusion pump 110 (FIG. 1) is connected to the recording chamber 74 for evacuation thereof. Another diffusion pump 112 (FIG. 2) is coupled to the recorder column 40 for its evacuation. The diffusion pumps 110 and 112 provide a vacuum environment for the electron beam recording operation on the electron-responsive disc master 32.

FIG. 3 shows a motor 114 which drives a set of shafts 116, 118, 120 to cause the lifter assemblies 64, 66, 68, 70, to lift and lower the cover plate 62. Universal couplings 122 are provided to prevent problems, such as vibrations, from occuring due to non-alignment of interconnecting shafts.

Figure 4:
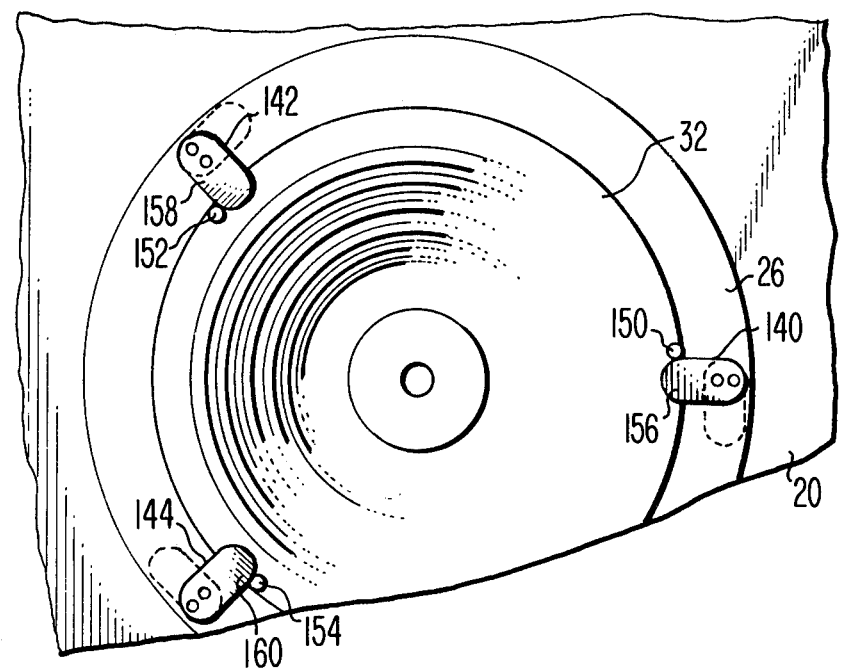
FIGS. 4 and 5 show a plan view and a sectional end view of the disc master positioning apparatus of FIG. 1.
Figure 5:
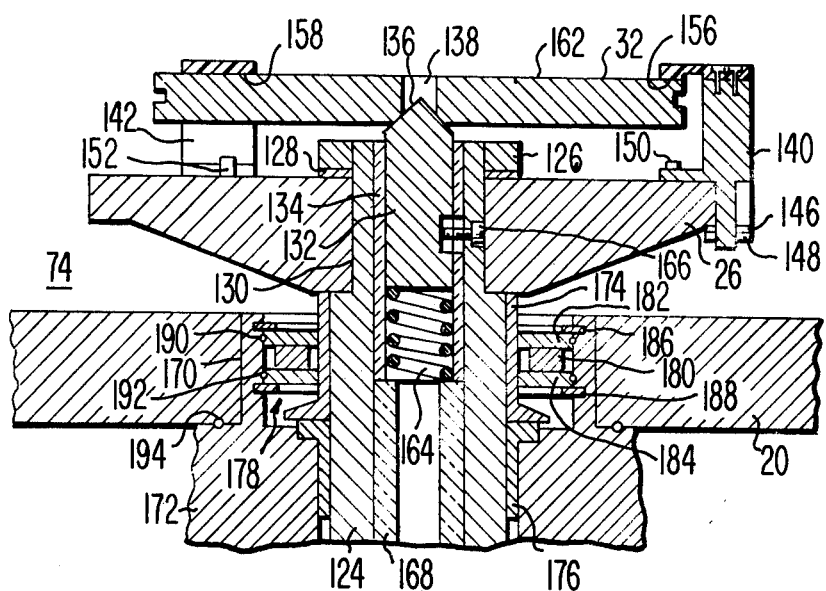

FIGS. 4 and 5 show a plan view and a sectional end view of an arrangement for positioning the disc master 32 on the turntable 26, pursuant to the principles of the present invention. As shown in FIG. 5, the turntable 26 is secured to a shaft 124 by a nut 126 and a washer 128. The turntable shaft 124 has a central opening 130 in which a centering spindle 132 is snugly received for reciprocal motion along the axis of rotation of the turntable shaft 124. A sleeve 134 is interposed between the centering spindle 132 and the turntable shaft 124 to electrically isolate the centering spindle from the turntable support system.

A portion 136 of the centering spindle is tapered for engagement with walls defining a centering aperture 138 of the disc master 32 in order to center the disc master with respect to the axis of rotation of the turntable 26.

As shown in FIG. 4, three axial locating members 140, 142, 144 are mounted to the peripheral portion of the turntable 26, for example, as shown by a washer 146 (FIG. 5) and a clamping split ring 148 (FIG. 5). The axial locating members 140, 142, 144 are movable between a first location, shown by solid lines in FIG. 4, and a second location, shown by dotted lines in FIG. 4. Stop pins 150, 152, 154 are secured to the turntable 26 to assure accurate positioning of the axial locating members 140, 142, 144 in the first location.

The axial locating members 140, 142, 144 have disc master-engaging ends 156, 158, 160 which define a recording plane 162 (FIG. 8) in which the recorder column 40 focuses the electron beam. The axial locating members 140, 142, 144 in the second locations (shown in phantom in FIG. 4) place the disc master-engaging ends 156, 158, 160 outside the path of travel of a disc master, to-and-from a position of centered engagement with the centering spindle 132, to permit, respectively, installation and removal of the disc master.

A spring 164, located in the turntable shaft central opening 130, biases the centering spindle 132 in a direction that causes the tapering portion 136 of the centering spindle 132, in engagement with the walls of the central aperture 138 of the disc master 32, to urge the disc master against the disc master-engaging ends 156, 158, 160 when the axial locating members 140, 142, 144 are occupying the first locations (shown by the solid lines in FIG. 4), to locate the electron-responsive surface of the disc master in alignment with the recording plane 162 defined by the disc master-engaging ends of the axial locating members.

A set screw 166 prevents the centering spindle 132 from being ejected out of the turntable shaft central opening 130 in the absence of a disc master on the turntable 26. A sleeve 168 is interposed between the spring 164 and the turntable shaft 124 to electrically isolate the centering spindle 132 from the turntable support system.

As shown by FIG. 5, the turntable shaft 124 protrudes outside the recording chamber 74 through an opening 170 in the base plate 20. A housing 172 is secured to the base plate 20. A sleeve 174, press-fitted to the turntable shaft 124, rests on a bushing 176 mounted in the housing 172. Bonding material is interposed between the turntable shaft 124 and the sleeve 174 to prevent air from leaking into the recording chamber 74 upon evacuation thereof.

A rotary seal 178 is interposed between the housing 172 and the sleeve 174 mounted on the turntable shaft 124. The rotary seal 178 comprises an annular permanent magnet 180 sandwiched between annular pole pieces 182 and 184. Clamping rings 186, 188, secured to the housing 172, hold the permanent magnet 180 and the pole pieces 182 and 184 in place. A fluid containing finely divided particles of iron is interposed between the pole pieces 182 and 184 and the sleeve 174 mounted on the turntable shaft 124. The rotary seal 178 prevents air from leaking into the recording chamber 74 upon evacuation thereof. O-rings 190, 192 and 194 are provided to maintain the vacuum integrity of the recording chamber 74. The rotary seal 178 may be of a type manufactured by FERRO-FLUIDICS CORPORATION, located in Burlington, Mass.

As previously indicated, the turntable support system and the turntable drive system are mounted external to the recording chamber 74 for several reasons. Such an arrangement reduces the volume of the recording chamber 74. Additionally, it keeps the recording chamber 74 clean from contamination. The electric motor 28 for driving the turntable 26 may be of a type manufactured by KOLLMORGEN CORPORATION, located in Glen Cove, N.Y.

FIG. 6 is a diagrammatic representation of an electron beam recording operation effected by the apparatus of FIGS. 1 and 2. The electron-responsive surface of the disc master 32 is successively exposed by a signal-modulated, ribbon-shaped electron beam 196, provided by the recorder column 40, to record signal elements 198, along the spiral groove 38 disposed on the disc master, in accordance with video-representative signal information. The electron-responsive surface of the disc master is then developed which causes the exposed portions thereof to be removed, to form a topography in the spiral groove 38 corresponding to the video-representative signal information. A nickel replication is made of the resultant disc master and this replication is utilized to stamp or emboss vinyl records. The vinyl replica is then metallized to make the surface conducting and the metalization is thereafter coated with a dielectric. In playing back the recorded information, a stylus is caused to ride in the dielectric-coated groove. This stylus, along with the metalization and dielectric, acts as a capacitor. Capacitance variations in the groove, which correspond to the recorded video information, are then detected electronically to recover the video information. A video disc system of this type is generally disclosed in U.S. Pat. No. 3,842,194 (Clemens).

FIG. 7 shows an arrangement for keeping the electron beam 196 centered in the groove 38 disposed on the surface of the disc master 32. As shown therein, the off-center electron beam 196 is reflected by the walls of the groove 38. The reflected electrons are sensed by radially disposed detectors 200 and 202. If the electron beam 196 is located slightly to the left of its centered position in the spiral groove 38, more energy is detected by the detector 202, located to the right of the electron beam, as compared with the detector 200. The outputs of the detectors 200 and 202 are coupled to a differential amplifier included in a comparator 204. The comparator 204 generates two error signals on leads 206 and 208. The error signal developed on the lead 206 is a function of instantaneous error in the centered position of the electron beam 196, and is applied to a deflection system 210. As shown by the dotted lines 212 in FIG. 7, the deflection system 210 serves to center the electron beam 196 in the spiral groove 38. The error signal developed on the lead 208 is a function of average error in the centered position of the electron beam 196, and is applied to the motor 84 which provides translational motion 214 to the recorder column 40. The deflection system 210 and the variation in the speed of the motor 84, together, serve to center the electron beam 196 in the spiral groove 38 throughout the range of recording on the disc master 32.

FIG. 8 shows an arrangement for preparing the source of the electron beam 196. As shown therein, a column set-up stage 216 is mounted to the base plate 20 within the recording chamber 74. The column set-up stage 216 is located adjacent the outside perimeter of the turntable supported disc master 32 with its focussing surface in registration with the recording plane 162. The motor 84, which provides the desired translational motion of the recorder column 40 during recording operations, additionally serves to selectively position the recorder column 40 over the column set-up stage 216 for determining electron beam characteristics, such as, current density, current distribution, shape, quality, proper focus, etc.

The column set-up stage 216 includes a Faraday cup 218 into which the electron beam is injected for determining the current of the electron beam. In order to direct the electron beam into the Faraday cup 218, the recorder column 40 is translated to a position such that the electron beam, shown by the dotted lines 220, is aligned with an entrance window 222 of the Faraday cup 218. A current meter 224 is coupled to the Faraday cup 218 for determining the beam current.

In order to determine the shape, distribution, quality, etc., of the electron beam, a specimen 226 is formed on the column set-up stage 216 by depositing small particles of an electron-scattering material, such as platinum, dispersed in an electron-absorbing background material, such as graphite (e.g., carbon aquadag). The deflection system 210 also serves to scan the electron beam 196 across the specimen 226 in a television raster manner. The electrons scattered by the specimen 226 are detected by the same detectors 200 and 202, which are additionally utilized for deriving groove tracking information during recording operations. The output of the detectors 200 and 202 are added and amplified by a display driving circuit 228. A display 230 is coupled to the output of the display driving circuit 228 for displaying the electron beam shape, distribution, etc. The information obtained from the current meter 224 and the display 230 is utilized to obtain proper intensity and distribution of the electron beam 196 on the recording plane 162.

In order to assure a proper focus of the electron beam on the electron-responsive surface of the disc master 32, a focussing structure 232 (FIG. 8) is placed on the surface of the column set-up stage 216 which is in registration with the electron-responsive surface of the disc master 32. The focussing structure 232 may include a number of very small spaced-apart balls (e.g., 1 micrometer in diameter) of highly electron-reflective material (e.g., gold). The focussing structure 232 is, a seriatim, scanned by the electron beam in the radial and the tangential directions. The electrons reflected by the gold balls are detected by the detectors 200 and 202. The output of the detectors 200 and 202 is summed by the display driving circuit 228 to develop a pulse waveform for projection on the display 230, with the shape of the waveform developed as the electron beam traverses a gold particle, providing an indication of the sharpness of focus. The demagnifying lenses in the recorder column 40 are adjusted to give a sharp image of the electron beam on the registered surface of the column set-up stage 216.

A height sensor 234 (FIG. 8) is secured to the lower protruding portion 76 of the recorder column 40 to sense the height of the lower protruding portion of the recorder column relative to either the registered surface of the column set-up stage 216 or the electron-responsive surface of the disc master 32. The height sensor 234 generates an error signal which is representative of variation in the height of the electron-responsive surface of the disc master 32 relative to the height of the registered surface of the column set-up stage 216 due to imperfect machining or mounting of the disc master. The demagnifying lenses in the recorder column 40, responsive to the error signal, adjust the focal length of the final demagnifying lens in order to maintain proper focus of the image of the electron beam on the electron-responsive surface of the disc master 32 throughout the range of translational motion of the recorder column over the disc master. The height sensor 234 may be of a type manufactured by ADE CORPORATION of Watertown, Mass.

What is claimed is:

1. In a system for recording signals by directing a beam of energy toward a disc master supported by a turntable rotatably mounted within a recording chamber; said beam of energy having characteristics representative of signals to be recorded; said disc master having a surface responsive to said beam of energy; an apparatus for positioning a disc master on a turntable comprising:

1. a centering spindle;
   said turntable having a central opening in which said centering spindle is snugly received for reciprocal motion along the axis of rotation of said turntable;
   a portion of said centering spindle protruding beyond a surface of said turntable facing said disc master;
   said protruding portion of said centering spindle having a tapering portion for engagement with walls defining said central aperture of said disc master in order to center said disc master with respect to said axis of rotation of said turntable;
   2. a plurality of axial locating members;
   each of said axial locating members having a disc master-engaging end;
   3. means for mounting each of said axial locating members to the peripheral portion of said turntable for movement between a first location and a second location;
   said axial locating members in said first locations disposing said disc master-engaging ends in a recording plane in which same beam of energy is focussed;
   said axial locating members in said second locations placing said disc master-engaging ends outside the path of travel of a disc master, to-and-from a position of centered engagement with said centering spindle, to permit, respectively, installation and removal of said disc master; and
   4. means located in said turntable central opening for biasing said centering spindle in a direction that causes said tapering portion of said centering spindle, in engagement with said wall of said central aperture of said disc master, to bias said disc master against said disc master-engaging ends of said axial locating members, when said axial locating members are occupying said first locations in order to locate said energy-responsive surface of said disc master in alignment with said recording plane defined by said disc master-engaging ends of said axial locating members.

2. A system as defined by claim 1 including a recorder column for providing said beam of energy; said system further including means for causing rotational motion of said turntable, and means for causing translational motion between said recorder column and said turntable along a path radially disposed with respect to said axis of rotation of said turntable, so that said beam of energy records along a generally spiral track on said energy-responsive surface of said disc master; said system additionally including column set-up means; said column set-up means having a stage located within said recording chamber, and positioned adjacent the outside perimeter of said turntable supported disc master; said stage having a focussing surface oriented in registration with said recording plane defined by said disc master-engaging ends of said axial locating members; said translational motion causing means additionally serving to selectively position said recorder column in alignment with said stage for detecting pertinent characteristics of said beam of energy.

3. A system as defined in claim 2 wherein said beam of energy comprises a beam of electrons; wherein said stage of said column set-up means includes a Faraday cup for determining the intensity of said electron beam.

4. A system as defined in claim 2 wherein said focussing surface of said set-up stage additionally supports a specimen; wherein said specimen comprises small particles of an energy-reflective material dispersed against a relatively energy-absorbing background; said recorder column including means for scanning said beam of energy across said specimen in a television raster manner; said system including means responsive to energy scattered by said energy-reflective particles of said specimen for producing a control signal during said scanning of said specimen; said system further including means responsive to said control signal for displaying the shape and quality of said beam of energy.

* * * * *

UNITED STATES PATENT OFFICE
CERTIFICATE OF CORRECTION

PATENT NO. : 4,040,089

DATED : August 2, 1977

INVENTOR(S) : JOSEPH GUARRACINI

It is certified that error appears in the above-identified patent and that said Letters Patent are hereby corrected as shown below:

Column 1, line 20, change "Junw" to --June--;

Column 3, line 4, change "basic" to --base--.

Signed and Sealed this

Seventeenth Day of October 1978

[SEAL]

Attest:

RUTH C. MASON
Attesting Officer

DONALD W. BANNER
Commissioner of Patents and Trademarks